United States Patent [19]

Serpelloni

[11] Patent Number: 4,744,991
[45] Date of Patent: May 17, 1988

[54] SPECKLED SUGARLESS CHEWING-GUM AND PROCESS FOR ITS MANUFACTURE

[75] Inventor: Michél Serpelloni, Béthune, France

[73] Assignee: Roquette Freres, Lestrem, France

[21] Appl. No.: 811,762

[22] Filed: Dec. 20, 1985

[30] Foreign Application Priority Data

Dec. 21, 1984 [FR] France ............... 84 19740

[51] Int. Cl.$^4$ ............... A23G 3/30
[52] U.S. Cl. ............... 426/5; 426/548; 426/250; 426/804
[58] Field of Search ............... 426/3–6, 426/96, 548, 98, 250, 540, 804

[56] References Cited

U.S. PATENT DOCUMENTS

| | | | |
|---|---|---|---|
| 2,190,180 | 2/1940 | Barker | 426/3 |
| 3,205,075 | 9/1965 | Heggie et al. | 426/5 |
| 3,930,026 | 12/1975 | Clark | 426/3 |
| 3,962,463 | 6/1976 | Witzel | 426/5 |
| 4,100,301 | 7/1978 | Friello | 426/3 |
| 4,208,431 | 6/1980 | Friello et al. | 426/3 |
| 4,217,368 | 8/1980 | Witzel et al. | 426/3 |
| 4,238,475 | 12/1980 | Witzel et al. | 426/3 |
| 4,248,895 | 2/1981 | Stroz et al. | 426/3 |
| 4,353,927 | 10/1982 | Lovercheck | 426/101 |
| 4,388,328 | 6/1983 | Glass | 426/3 |
| 4,514,423 | 4/1985 | Tezuka et al. | 426/3 |
| 4,556,565 | 12/1985 | Arima et al. | 426/3 |
| 4,588,592 | 5/1986 | Elias | 426/5 |

FOREIGN PATENT DOCUMENTS

| | | |
|---|---|---|
| 1228510 | 8/1960 | France . |
| 2197568 | 3/1974 | France . |
| 2444080 | 7/1980 | France . |
| 2445839 | 8/1980 | France . |
| 2486364 | 1/1982 | France . |
| 2502495 | 10/1982 | France . |
| 84/03201 | 8/1984 | PCT Int'l Appl. . |
| 2053651 | 2/1980 | United Kingdom . |

OTHER PUBLICATIONS

"Food Technology", vol. 38, No. 3, Mar. 1984, p. 121.

*Primary Examiner*—Jeanette Hunter
*Attorney, Agent, or Firm*—Fleit, Jacobson, Cohn & Price

[57] ABSTRACT

Sugarless speckled chewing-gum having, distributed in the mass, a plurality of colored sweetening particles, possibly flavored and possibly sweetened with artificial sweeteners, the coloring agent being confined in the sweetener particles.

13 Claims, No Drawings

SPECKLED SUGARLESS CHEWING-GUM AND PROCESS FOR ITS MANUFACTURE

BACKGROUND OF THE INVENTION

The invention relates to a speckled sugarless chewing-gum.

This chewing-gum arouses the interest of the consumer by reason of its original visual appearance.

The invention relates also to a process suitable for its manufacture.

Chewing-gums of the type concerned comprise an aqueous liquid phase.

They comprise:
about 10 to 40% of a gum base constituted, for example, from a mixture of natural gum, synthetic resins and waxes, about 9 to 80% of a liquid sweetener constituted by a syrup based on hydrogenated sugars, for example by sorbitol syrup, about 0 to 75% and, more particularly, about 2 to 75% of a solid sweetener constituted, for example, by a crystalline polyol among which are particularly sorbitol or mannitol, various flavouring agents, various preserving agents and various agents modifying the texture of the gum base, like glycerin or lecithin.

The speckled appearance is generally obtained by means of solid sweetening particles, colored and possibly flavored.

The proportion by weight represented by the colored particles with respect to the total weight of the chewing-gum is of the order of 0.5 to 3%, particularly 1%.

In practice, the colored particles are constituted essentially of sorbitol colored in the mass. They can be flavored by means of conventional flavorings; it will be possible to use in this respect synthetic or any flavorings obtained from certain plants; there may be mentioned oils of mint, cinnamon, etc.

The particles concerned can, moreover, be sweetened, particularly by means of artificial sweeteners such as saccharin, aspartam and the like.

Their granulometry is generally from 500 to 1500 $\mu$m and more particularly from 800 to 1200 $\mu$m.

The abovesaid chewing-gums are generally prepared in the following manner:

the gum base is softened in a kneading trough by heating and by kneading, into the soft gum base are introduced successively, and while maintaining the abovesaid heating and kneading, sweetener in liquid phase, sweetener in solid phase and then, or as the case may be at the same time, the solid sweetening particles, colored and possibly flavored, the composition thus prepared is subjected, for example, to extrusion, through a die, then to rolling and cutting-up to give it the marketed shape, for example rectangular.

At the moment of its manufacture, the chewing-gum so-obtained has at its surface speckles constituted by colored and possibly flavored sweetener particles, these particles being more or less embedded in the gum base and more or less crushed during the final rolling step.

Now, when the sweetener particles have been colored in the mass by a water-soluble dye, this dye diffuses very rapidly and integrally into the mass of the chewing-gum, and even by replacing this type of dye by a water-insoluble dye, or lacquer, the diffusion phenomenon, although slowed down, still exists, particularly with red dyes to the point of becoming detectable after about 10 days and to the point that after about 30 days the dye initially concentrated in the mass of each particle is found to be completely diluted throughout the mass of the chewing-gum, so that it is no longer possible to rediscover visually the position of the initial colored particles, only more or less blurred and indefinite spots subsisting.

GENERAL DESCRIPTION OF THE INVENTION

To overcome this drawback, it has already been envisaged to resort to the encapsulation of the sweetener particles dyed by means of water-insoluble coating products, particularly of the food grade shellac type.

The thus coated products give satisfaction from the point of view of confining the coloring but have the drawback of confining also entirely and with hardly any possibility of release, the flavors and/or artificial sweeteners which can enter into the constitution of the colored particle and whose full effect is then lost.

In addition, this is a solution of high cost price—since it necessitates a separate processing line for the colored sweetener particles—, hardly compatible with the manufacture of a competitive speckled chewing-gum.

Now, applicant succeeded after extensive research work in preparing a sugarless speckled chewing-gum no longer presenting the drawbacks of the prior art and comprising, distributed in the mass, a plurality of colored sweetening particles, possibly flavored and possibly sweetened with artificial sweeteners, this chewing-gum being characterized by the fact that it comprises at least one of the confining agents selected from the group consisting of the food grade fatty acids such as stearates, particularly magnesium stearate, incorporated in the particles in a proportion of about 0.5 to 4% by weight with respect to the weight of the particles, of the food grade conventional emulsifiers such as the fatty acid esters, particularly glycerol ester incorporated in the particles in a proportion of about 0.5 to 5% by weight with respect to the weight of the particles, and of the hydrogenated starch hydrolysates whose glucidic spectrum is as follows, percentages being given with respect to the dry matter:

maltitol: 25 to 95%, preferably 25 to 85%,
sorbitol: 0.1 to 19%, preferably 1 to 17%,
the complement to 100 being constituted by polyols of degree of polymerization (DP)$\geq$3, these hydrolysates being incorporated in the liquid phase of the chewing-gum in a proportion of about 5 to 30% by weight with respect to the total mass of the chewing-gum.

Concerning first the above-mentioned food grade fatty acids and the above-mentioned food grade conventional emulsifiers, they are incorporated as indicated hereabove into the colored sweetened particles.

Surprisingly, the effectiveness of these products which are hydrophobing agents is sensible in the formulations utilized at very low concentrations. The organoleptic properties of the thus obtained chewing-gums are not affected.

A proportion of about 1% of magnesium stearate or of food grade emulsifier in the colored sweetener particles enables the coloring to be confined for a period which can reach about 3 months; beyond 4% the taste of the hydrophobic product can become troublesome.

Concerning then the hydrogenated starch hydrolysates, they are incorporated into the liquid phase of the chewing-gum.

These products enable the prolongation in crucial proportions of the confinement of the coloring agent in the colored sweetener particle as soon as this sweetener is essentially constituted by sorbitol and this confinement can be considered as permanent taking into account the extreme times and conditions of storage encountered in industry and commerce of chewing-gum.

This result is all the more surprising and unexpected as the hydrogenated starch hydrolysate employed contains, just like the liquid sorbitol syrup which conventionally constitutes the liquid phase of chewing-gum, a considerable amount of water.

Preferably, hydrogenated starch hydrolysate having the following composition is used:
  maltitol from 35 to 75%
  sorbitol from 5 to 17%
  maltotriitol from 10 to 25%,
the complement to 100 being constituted by polyols of degree of polymerization or $DP \geq 4$.

A hydrogenated starch hydrolysate giving a particularly advantageous result is that marketed under the name LYCASIN®80/55, the dry matter content of which is 70% and which has the following composition:
  hydrogenated disaccharides from 50 to 55%
  sorbitol from 6 to 8%
  hydrogenated tri- to hexa-saccharides from 20 to 25%
  hydrogenated saccharides of $DP \geq 6$ from 15 to 20%.

According to another advantageous embodiment, the chewing-gum according to the invention comprises:
  as constituent, a proportion with respect to the total weight of the chewing-gum of about 5 to about 30% by weight of the above-said hydrogenated starch hydrolysate,
  a plurality of colored sweetener particles, possibly flavored and comprising optionally an artificial sweetener, these particles being distributed within its constituent mass and comprising from about 0.5 to about 4% of a hydrophobant agent of the type of food grade fatty acid salts such as stearates, particularly magnesium stearate, or of from 0.5 to 5% of the conventional food grade emulsifier type such as the fatty acid esters, particulaly the glycerol ester.

The process according to the invention for the manufacture of chewing-gum according to the invention is characterized by the fact that:
  at the moment of manufacture of the colored and possibly flavored sweetener particles, these particles are made to include a proportion of about 0.5 to about 4% of a hydrophobant agent of the food grade fatty acid salt type such as stearates, particularly of magnesium, or of a proportion of about 0.5 to 5% of the conventional food grade emulsifier type such as fatty acids esters, particularly the glycerol ester, and/or by the fact that
  the liquid phase is made to comprise, by addition at the moment of kneading inside the kneading trough, a proportion from about 5 to 30% with respect to weight of the chewing-gum of a hydrogenated starch hydrolysate such as defined above.

The invention will be still better understood by means of the examples which follow and which either serve to provide elements of comparison, or relate to advantageous embodiments of the invention.

DESCRIPTION OF PARTICULAR EMBODIMENTS

Examples

By following the manufacturing process indicated at the beginning of the description, various chewing-gums including colored particles were compared.

The exact compositions of the finished chewing-gums as well as the measurements of the diffusion of the dye entering into the constitution of the colored particles, after storage in the ambient medium, are collected in Table I.

In this table:
the chewing-gum denoted by "Ch 1" corresponds to the reference chewing-gum in which the sweetener of the solid phase is constituted by a mixture of powdered sorbitol namely that marketed under the trademark NEOSORB®P 60 by applicant's Assignee, of saccharin and of mannitol in powdered condition; the sweetener of the liquid phase is constituted by a sorbitol syrup with 70% of dry matter, namely that marketed under the trademark of NEOSORB®70/70 M by applicant's Assignee; the colored particles are constituted by sorbitol granules of a granulometry comprised between 800 and 1200 $\mu$m and of an average granulometry of 1000 $\mu$m; they are previously colored in the mass with an insoluble lacquer for example of the type ALLURO RED COLOR INDEX CI 16035 or of the type FAST GREEN FCF COLOR INDEX 42053; this type of chewing-gum comprises in addition various additives or texture agents like glycerin, and like mint flavoring LAUTAROME 29970 (marketed by the company LAUTIER Grasse, France);

the chewing-gum denoted by "Ch 2" corresponds to a chewing-gum identical with Ch 1 with the difference that the colored particles are composed of colored sorbitol grains in which there has been introduced homogenously 1% by weight of magnesium stearate, the percentage by weight of magnesium stearate being given with respect to the weight of colored and flavored sorbitol;

the chewing-gum denoted by "Ch 3" corresponds to a chewing-gum identical with Ch 1 with the difference that the colored and flavored particles are composed of sorbitol grains colored in the mass, previously coated in a dragee-forming apparatus with an insoluble lacquer of the shellac type marketed by the CARL ROTH KG CHEMISCHE FABRIKEN Company, the proportion of shellac being 2% by weight with respect to the weight of the colored and flavored sorbitols;

the chewing-gum denoted by "Ch 4" corresponds to a chewing-gum identical with Ch 1 with the difference that the liquid phase is constituted for 50% of a first maltitol syrup having a dry matter content of 70% denoted by "maltitol syrup no. 1" and comprising with respect to the dry matter 90.5% maltitol, 2.3% sorbitol, 6.2% of maltotritol and 0.4% of products of degree of polymerization $\geq 4$ and for 50% of a hydrogenated glucose syrup of the trademark LYCASIN®80/55;

the chewing-gum denoted by "Ch 5" corresponds to a chewing-gum identical with Ch 1 with the difference that the liquid phase constituted solely by hydrogenated syrup LYCASIN®80/55, the chewing-gum denoted by "Ch 6" corresponds to a chewing-gum identical with Ch 1 with the difference that the liquid phase constituted for 42.5% of a second maltitol syrup with a dry matter content of 70% denoted by "maltitol syrup no. 2" and comprising with respect to the dry matter 73.1% by weight of maltitol, 3.2% of sorbitol, 14.8% of maltotriitol and 8% of products of DP ≧4 and for 57.5% of NEOSORB ®70/70M sorbitol syrup.

TABLE I

| COMPSITION | Ch 1 | Ch 2 | Ch 3 | Ch 4 | Ch 5 | Ch 6 |
|---|---|---|---|---|---|---|
| Gum base | 30,0% | 30,0% | 30,0% | 30,0% | 30,0% | 30,0% |
| Solid sweetener (in powder form): | | | | | | |
| NEOSORB ® P 60 sorbitol | 42,52% | 42,52% | 42,52% | 42,52% | 42,52% | 42,52% |
| Mannitol | 4,0% | 4,0% | 4,0% | 4,0% | 4,0% | 4,0% |
| Colored particles constituted by dyed and flavored sorbitol powder | 1% | 1% | 1% | 1% | 1% | 1% |
| Liquid Sweetener: | | | | | | |
| LYCASIN ® 80/55 | 0 | 0 | 0 | 8,25% | 16,50% | 0 |
| NEOSORB ® 70/70 M | 16,50% | 16,50% | 16,50% | 0 | 0 | 9,50% |
| Maltitol syrup no. 1 | 0 | 0 | 0 | 8,25% | 0 | 0 |
| Maltitol syrup no. 2 | 0 | 0 | 0 | 0 | 0 | 7% |
| Additive: | | | | | | |
| Glycerin | 5,0% | 5,0% | 5,0% | 5,0% | 5,0% | 5,0% |
| Magnesium Stearate (% with respect to total weight) | 0 | 0,01% | 0 | 0 | 0 | 0 |
| Coating Lacquer of the shellac type (% relative to total weight) | 0 | 0 | 0,02% | 0 | 0 | 0 |
| Flavoring | q.s.p. 100% | q.s.p. 100% | q.s.p. 100% | q.s.p. 100% | q.s.p. 100% | q.s.p. 100% |
| Diffusion after 10 days | starts | non-existant | non-existant | non-existant | non-existant | non-existant |
| Diffusion after 90 days | total | very slight | non-existant | not visible | not visible | very slight |
| Diffusion starts at | 10 days | 90 days | non-existant at 200 days | not visible at 200 days | not visible at 200 days | 90 days |

From the results of Table I, it is deduced that the chewing-gums according to the invention (Ch 2 and Ch 4 to Ch 6) do not show diffusion during the usual storage times, which are generally less than 3 months; furthermore, the flavor is well perceived contrary to what happens with chewing-gum Ch 3.

As is self-evident and as can be readily understood and appreciated from the foregoing, the invention is in no way limited to those features, particulars and examples specifically described; it encompasses thereof, on the contrary, all modifications.

What is claimed is:

1. In a sugarless speckled chewing-gum comprising a gum base, a sweetener in liquid phase, a sweetener in solid phase and a plurality of sweetening particles comprising a coloring or dye, the improvement comprising confining the coloring or dye inside the sweetening particles by incorporating at least one confining agent selected from the group consisting of the edible stearates, edible fatty acid esters and hydrogenated starch hydrolysates whose glucidic spectrum is as follows, percentages being given with respect to the dry matter:
   maltitol: 25 to 95%,
   sorbitol: 0.1 to 19%,
the complement to 100 being constituted by polyols of degree of polymerization (DP) ≧3,
   wherein the stearates are incorporated, in the sweetening particles in a proportion of about 0.5 to 4% by weight with respect to the weight of the particles,
   wherein the fatty acid esters are incorporated, in the sweetening particles in a proportion of about 0.5 to 5% by weight with respect to the weight of the particles, and/or
   wherein the hydrogenated starch hydrolysates are incorporated, in the sweetener in liquid phase in a proportion of about 5 to 30% by weight with respect to the total mass of the chewing-gum.

2. Sugarless speckled chewing-gum according to claim 1, wherein the sweetening particles comprising a coloring or dye are flavored.

3. Sugarless speckled chewing-gum according to claim 1, wherein the sweetening particles comprising a coloring or dye are flavored and comprise an artificial sweetener.

4. Sugarless speckled chewing-gum according to claim 1, wherein the stearate is magnesium stearate.

5. Sugarless speckled chewing-gum according to claim 1, wherein the fatty acid ester is glycerol ester.

6. Sugarless speckled chewing-gum according to claim 1, wherein the hydrogenated starch hydrolysate comprises from 25 to 85% of maltitol and from 1 to 17% of sorbitol with respect to the dry matter.

7. Sugarless speckled chewing-gum according to claim 1, wherein the hydrogenated starch hydrolysate has the following composition:
   maltitol from 35 to 75%
   sorbitol from 5 to 17%
   maltotriitol from 10 to 25%,
the complement to 100 being constituted by polyols of degree of polymerization or DP ≧4.

8. Sugarless speckled chewing-gum according to claim 1, wherein the hydrogenated starch hydrolysate has the following composition:
   hydrogenated disaccharides from 50 to 55%
   sorbitol from 6 to 8%
   hydrogenated tri- to hexa-saccharides from 20 to 25%
   hydrogenated saccharides of DP >6 from 15 to 20%.

9. In the process for the preparation of the chewing-gum according to claim 1, comprising:
   softening of the gum base by heating and kneading,
   continuing the said heating and kneading and introducing in the soft gum base successively the sweetener in liquid phase, the sweetener in solid phase and then or at the same time, the solid sweetening particles comprising a coloring or dye,
   subjecting the resulting composition to extrusion, through a die, then to rolling and cutting-up to give it the marketed shape,
the improvement comprising supplementing the solid sweetening particles comprising a coloring or dye with a proportion of about 0.5 to about 4% with respect to the weight of the particles of an edible stearate, whereby the coloring or dye is confined inside the said particles.

10. Process according to claim 9, comprising supplementing the solid sweetening particles comprising a coloring or dye with a proportion of about 0.5 to about 4% with respect to the weight of the particles of magnesium stearate, whereby the coloring or dye is confined inside the said particles.

11. Process according to claim 9, comprising supplementing the solid sweetening particles comprising a coloring or dye with a proportion of about 0.5 to 5% with respect to the weight of the particles of an edible fatty acids ester, whereby the coloring or dye is confined inside the said particles.

12. Process according to claim 9, comprising supplementing the solid sweetening particles comprising a coloring or dye with a proportion of about 0.5 to 5% with respect to the weight of the particles of glycerol ester, whereby the coloring or dye is confined inside the said particles.

13. In the process for the preparation of the chewing-gum according to claim 1, comprising:

softening of the gum base by heating and kneading, continuing the said heating and kneading and introducing in the soft gum base successively the sweetener in liquid phase, the sweetener in solid phase and then or at the same time, the solid sweetening particles comprising a coloring or dye, subjecting the resulting composition to extrusion, through a die, then to rolling and cutting-up to give it the marketed shape, the improvement comprising supplementing the sweetener in liquid phase at the moment of kneading with a proportion of about 5 to 30% with respect to the total weight of the chewing-gum of a hydrogenated starch hydrolysate whose glucid spectrum is as follows, the percentages being given with respect to dry matter;

maltitol: from 25 to 95%, sorbitol: from 0.1 to 19%, the complement to 100 being constituted by polyols of degree of polymerization $\geq 3$, whereby the coloring or dye is confined inside the said particles.

* * * * *